United States Patent [19]
Wan et al.

[11] Patent Number: 5,799,755
[45] Date of Patent: Sep. 1, 1998

[54] LINEAR MOTOR TRANSFER OF CAB HORIZONTALLY BETWEEN ELEVATOR AND BOGEY PLATFORMS

[75] Inventors: Samuel C. Wan, Simsbury, Conn.; Richard W. Calcasola, Longmeadow, Mass.; Jack M. Thompson, Mason, Ohio; Vlad Zaharia, Rocky Hill, Conn.; Anthony Cooney, Unionville, Conn.; Terry M. Robar, Farmington, Conn.; Richard J. Ericson, Southington, Conn.; Dave C. Jarvis, Manchester, Conn.; Richard R. Polacek, Simsbury, Conn.; Satish P. Patel, Newington, Conn.

[73] Assignee: Otis Elevator Company, Farmington, Conn.

[21] Appl. No.: 749,295

[22] Filed: Nov. 14, 1996

[51] Int. Cl.$^6$ ........................................ B66B 17/22
[52] U.S. Cl. .................. 187/403; 187/249; 187/289; 187/394; 187/391
[58] Field of Search .................. 187/403, 401, 187/413, 249, 289, 394, 391

[56] References Cited

U.S. PATENT DOCUMENTS 5,090,515  2/1992  Takahashi et al. ................ 187/249

FOREIGN PATENT DOCUMENTS 156939A  6/1994  Japan .................... 187/289

Primary Examiner—William E. Terrel
Assistant Examiner—Khoi H. Tran

[57] ABSTRACT

A cab having a wheeled carriage fixed thereto is moved between rails on an elevator car frame and similar rails on a wheeled bogey. The ends of the rails are scarfed in a complimentary fashion so as to provide a temporary half-lap joint between the rails of the bogey and the rails of the car frame. Motion is provided by linear motors having active primaries disposed on the car frame and the bogey and passive secondaries disposed on the cab carriage. Motor control is in response to position signals provided by magnetostrictive linear displacement transducers. The cab carriage includes rollers on vertical axes which contact the insides of the rails for guidance. The cab carriage wheels and rollers are disposed in pairs separated sufficiently so that at least one roller and one wheel of each pair is in contact with a full rail as the carriage crosses the rail joints between the car frame and the bogey. Wheels coated with urethane reduce wheel noise and tapers at the ends of the rails provide smooth rail to rail transitions.

4 Claims, 7 Drawing Sheets

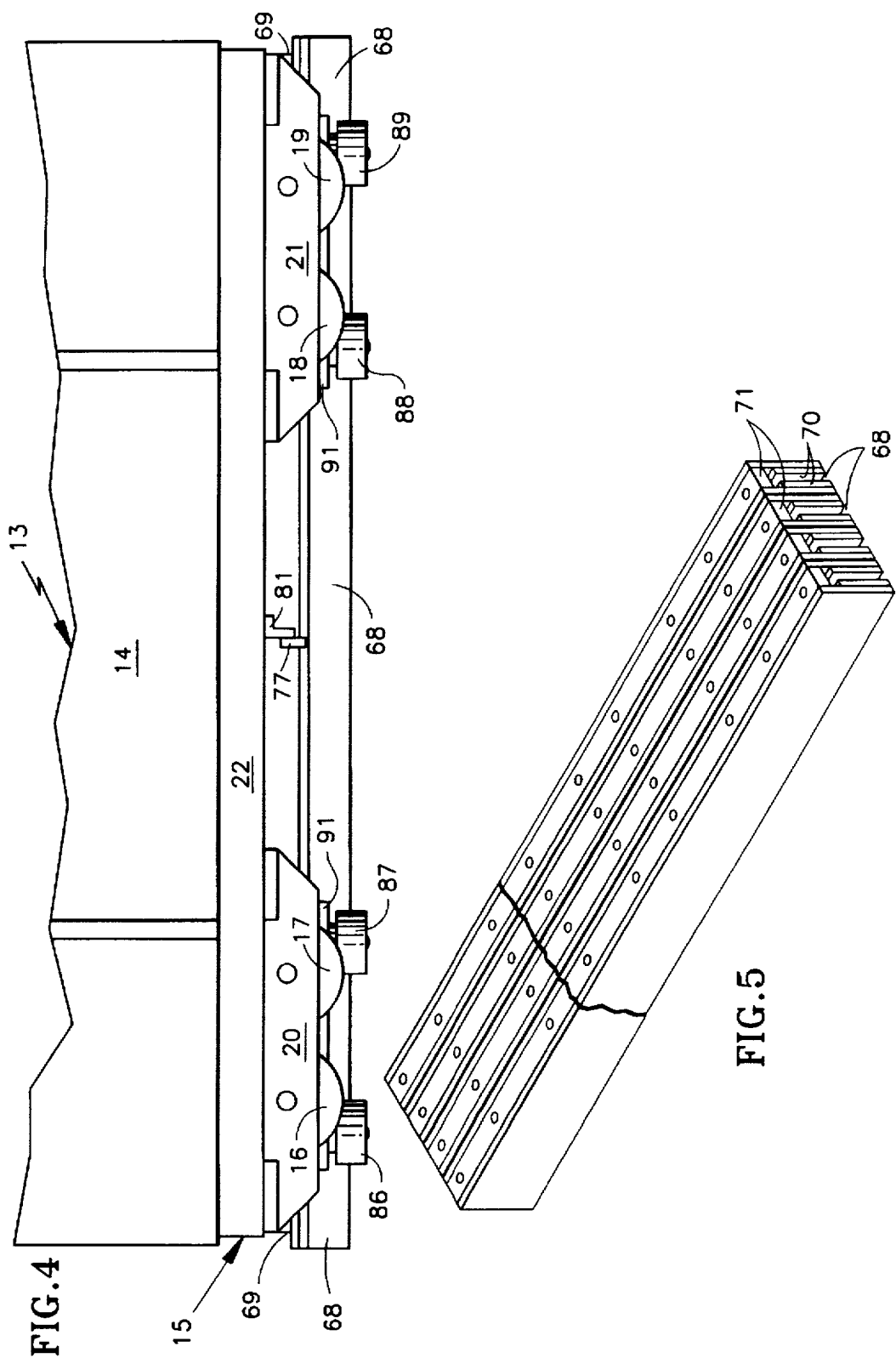

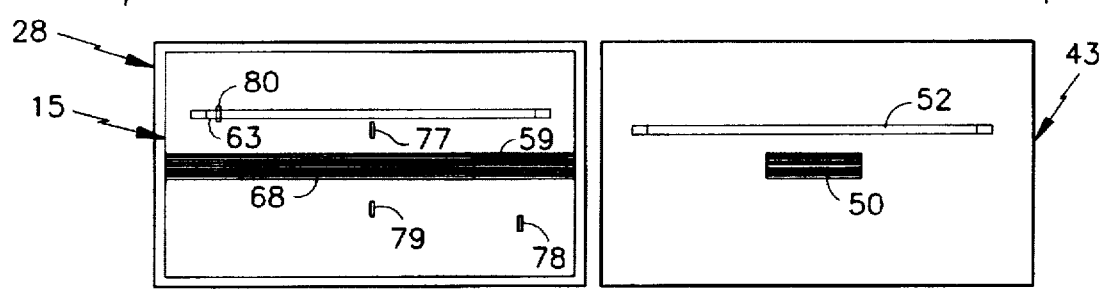
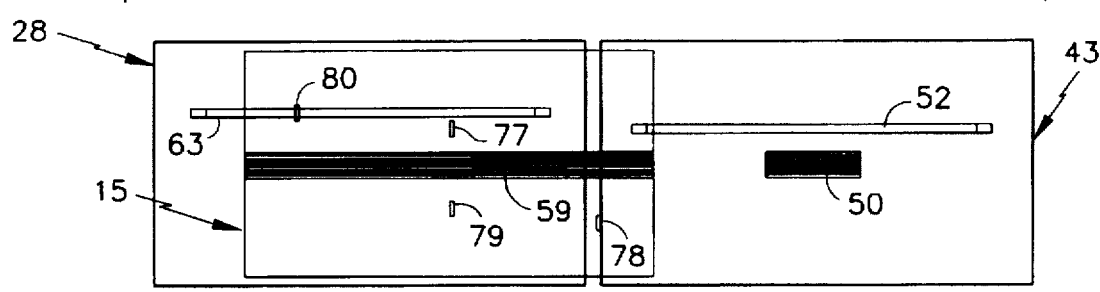
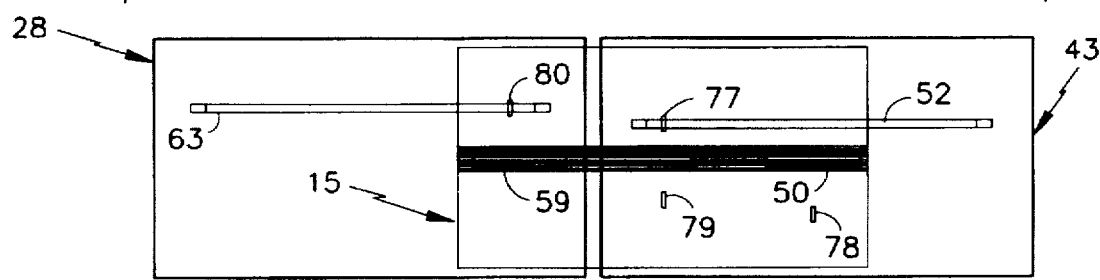
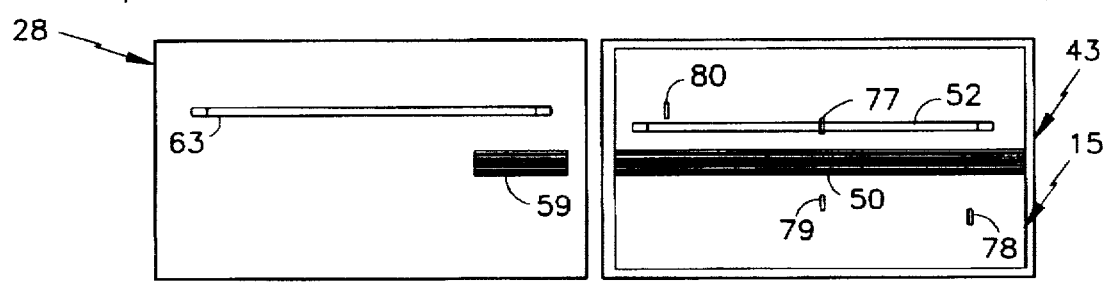

FIG.11
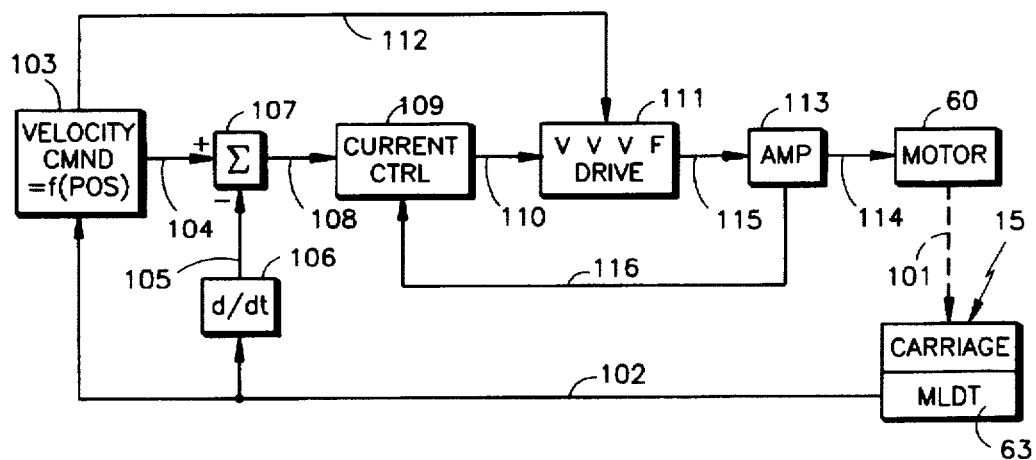
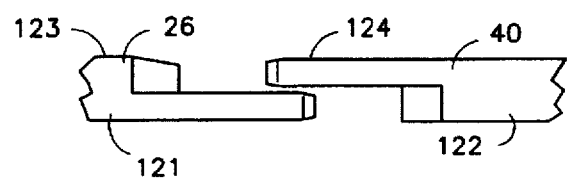
FIG.12

1

LINEAR MOTOR TRANSFER OF CAB HORIZONTALLY BETWEEN ELEVATOR AND BOGEY PLATFORMS

TECHNICAL FIELD

This invention relates to moving a cab between an elevator car frame in a hoistway and a horizontally moveable wheeled bogey, and more particularly to the drive means therefor.

BACKGROUND ART

Passenger transportation systems associated with buildings have typically comprised elevators in which single elevator cars, possibly having a plurality of decks, one over the other, are moved upwardly and downwardly in a hoistway by means of a traction machine roped between the elevator car and a counterweight. The utilization of roped systems in very tall buildings is made possible by moving the elevator cab from a car frame in one roped hoistway to a car frame in another roped hoistway.

The horizontal movement of an elevator cab between an elevator car frame and either a landing or another elevator car frame by means of racks and pinions is described in commonly owned U.S. patent application Ser. No. 08/564, 704, filed Nov. 29, 1995. The mechanism described therein is also used to horizontally transfer elevator cabs between elevator hoistways and a dolly, so that the cab can be moved between non-contiguous hoistways, as described in commonly owned U.S. patent application Ser. No. 08/666,162, filed on Jun. 19, 1996.

In addition to proposed buildings being extremely tall, such as on the order of one-half mile, building complexes of a significant extent have caused the relationship between vertical and horizontal transportation to be studied anew.

DISCLOSURE OF INVENTION

Objects of the invention include provision of improved means for transferring an elevator cab between a vertically moving elevator car frame in a hoistway and a wheeled bogey horizontally moveable on tracks.

According to the present invention, a wheeled, horizontally moveable cab includes the secondary portion of a linear motor disposed on a carriage beneath the cab, one primary portion of the linear motor disposed on the elevator car frame, as well as another second primary portion of the linear motor being disposed on a bogey. In accordance with the invention in the preferred form, an active linear motor primary is disposed on the elevator car frame and at least one active linear motor primary is disposed on the bogey; a passive linear motor secondary extends throughout the length of the cab carriage so as to cooperate with either or both of the primaries, depending on the position of the cab on the car frame, on the bogey, or in part on each. The linear motor in each case is driven by position signals indicative of the relative position of the cab with respect to the car frame, or with respect to the bogey, or both. In a preferred form, the position signals are provided by position transducers, one element of which is mounted on the car frame and a corresponding element of which is mounted to be in cooperative relationship therewith on the bottom of the cab, another transducer has a first portion mounted on the bogey and a second portion mounted to cooperate therewith on the bottom of the cab, the position signals from each of the transducers being utilized to control the corresponding linear motor so as to accurately move the cab on the car frame and/or the bogey. The transducers may be magnetostrictive linear displacement transducers with magnetic marker plates disposed on the cab carriage.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 4 is a partial, simplified side elevation view of the cab of FIG. 1.

FIG. 5 is a broken away perspective view of a plurality of linear motor secondaries for the elevator car carriage of FIG. 4.

FIGS. 7–10 are simplified, stylized illustrations of the operation of the linear motors and position transducers as the cab is moved from the bogey onto the platform of the elevator car frame of FIG. 1.

FIG. 11 is a simplified schematic block diagram of an exemplary motor drive system for the linear motors on the bogeys and the elevator car frame platform.

FIG. 12 is a fragmentary top plan view of one of the rails of the car frame and the bogey when overlapped.

BEST MODE FOR CARRYING OUT THE INVENTION

Figure 1:
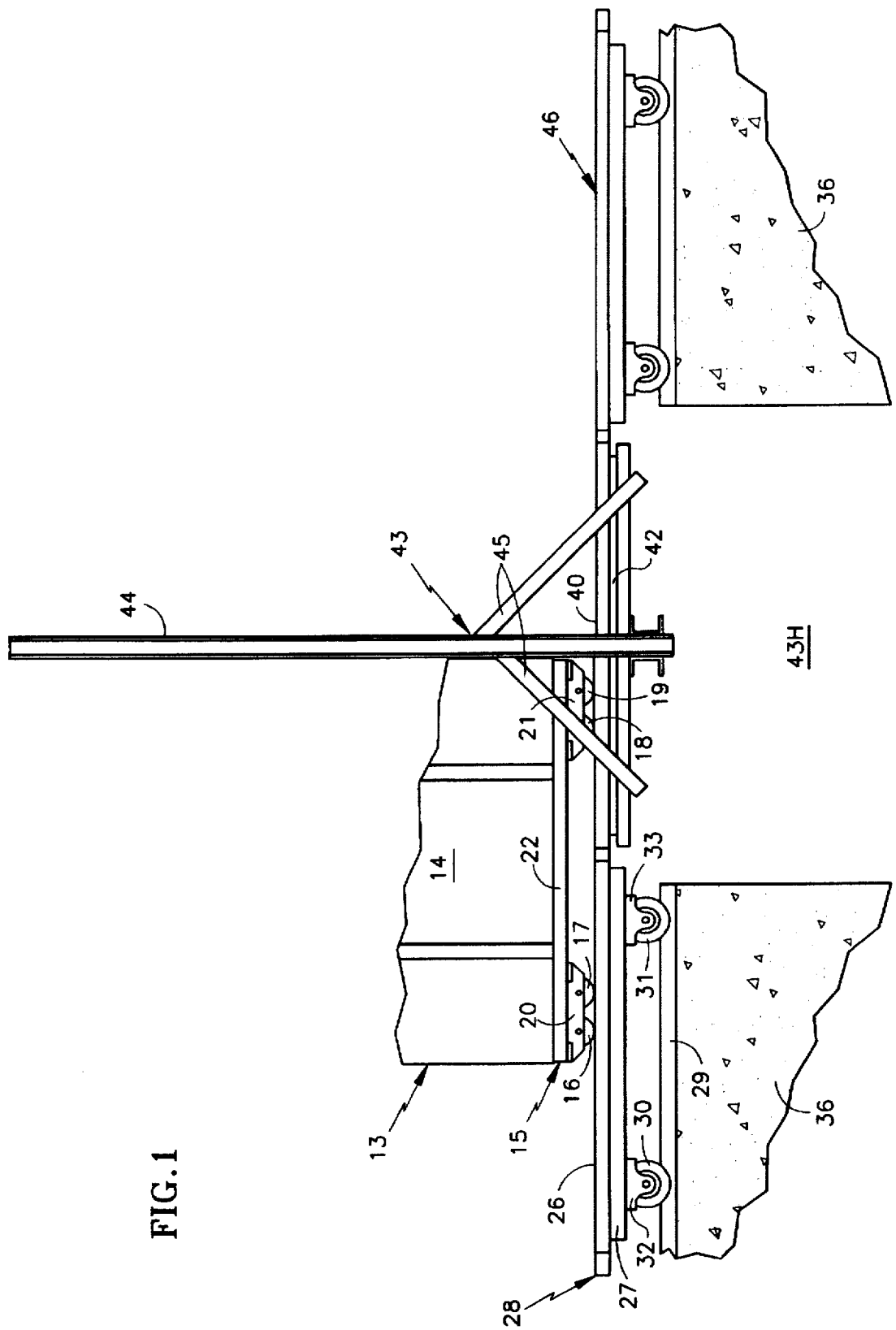
FIG. 1 is a simplified, stylized, partial, partially sectioned, side elevation view of an elevator car frame in accordance with the invention receiving a cab from one of a pair of bogeys.

Referring now to FIG. 1, a cab 13 includes a passenger compartment 14 and a carriage 15. The carriage 15 has wheels 16–19 disposed on brackets 20, 21 attached to a frame 22. The reverse side of the carriage 15 has four similarly-positioned wheels, only wheel 23 being shown in FIG. 6.

Figure 3:
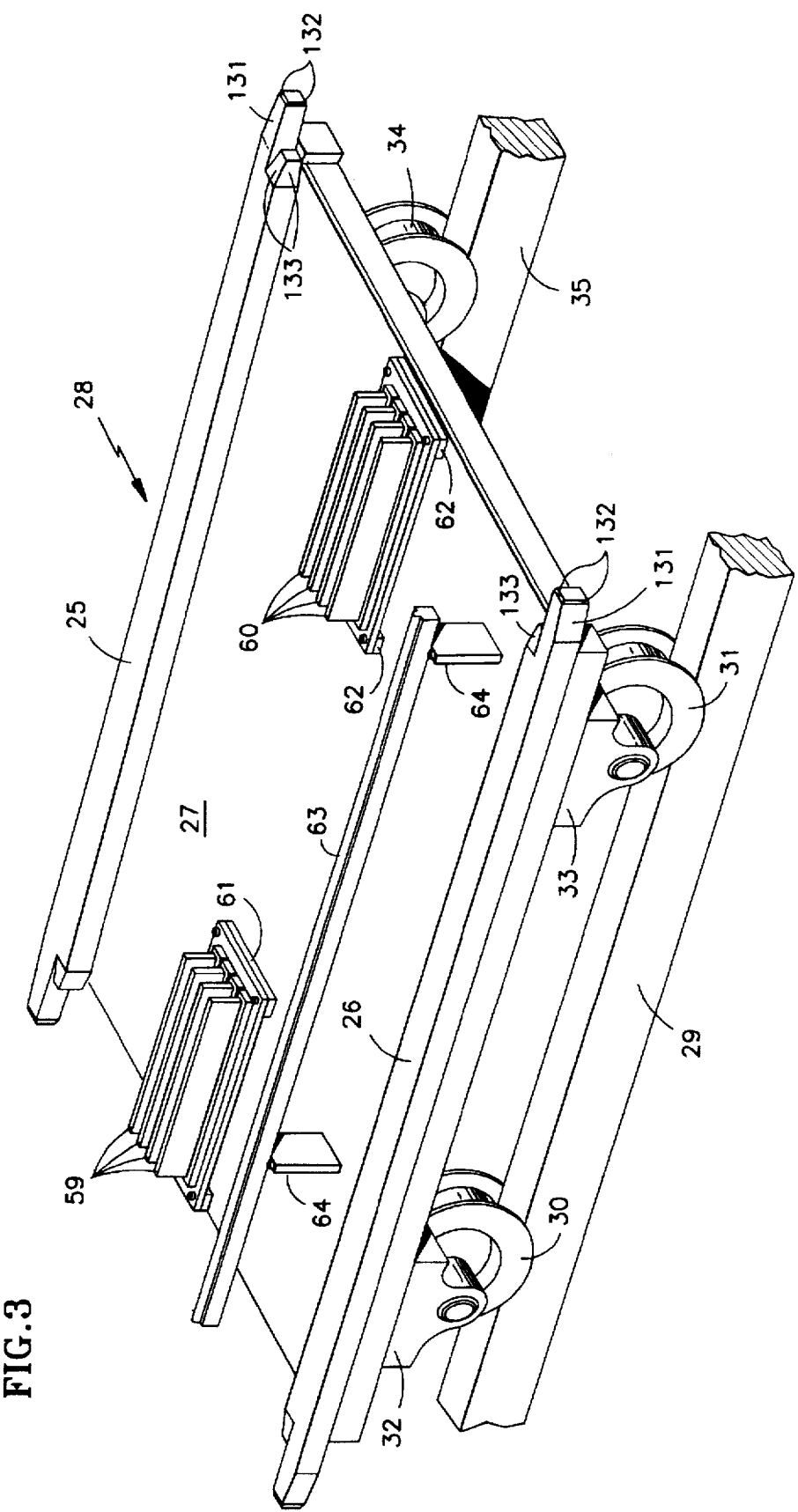
FIG. 3 is a simplified perspective view of one of the bogeys of FIG. 1.
Figure 6:
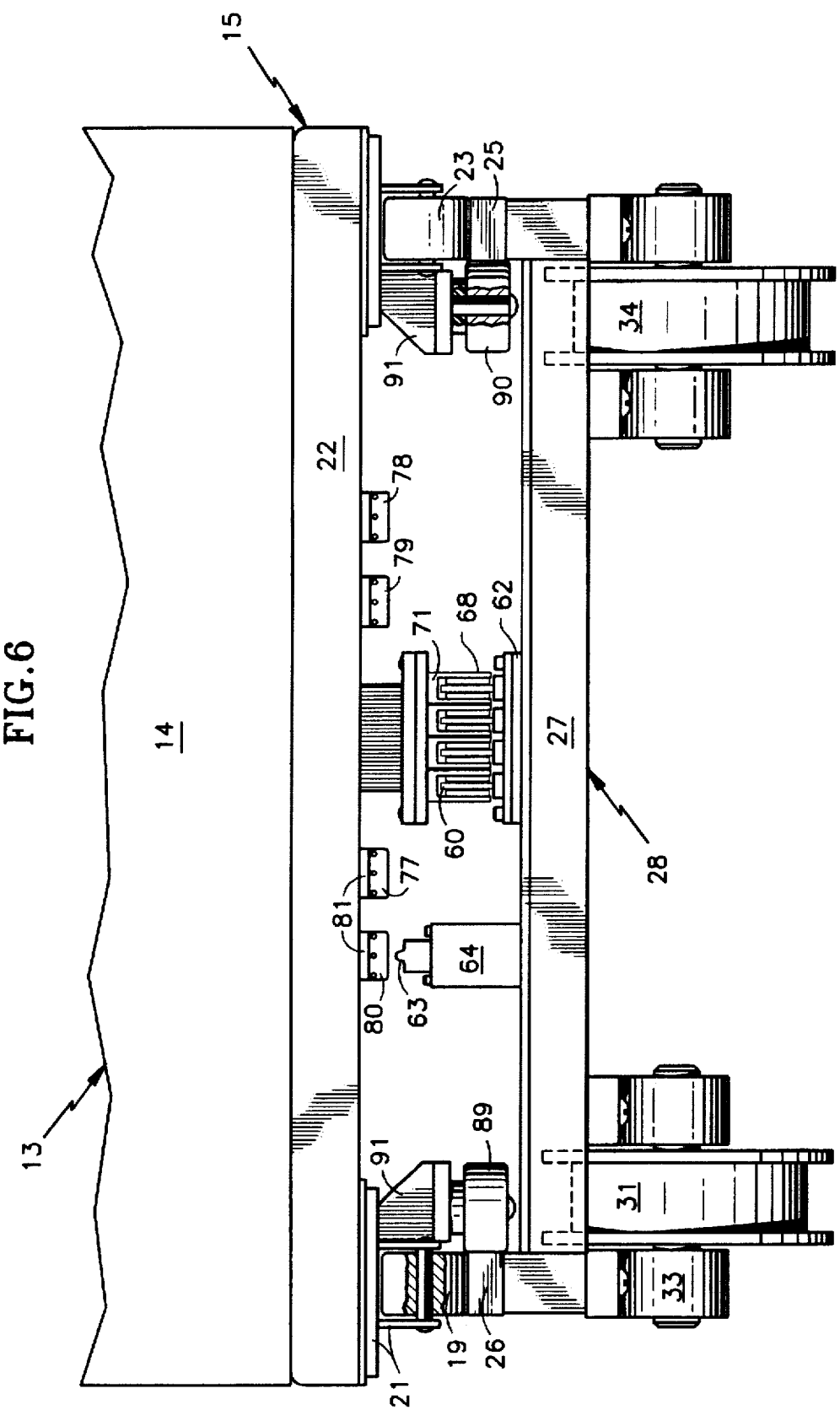
FIG. 6 is a simplified, partially sectioned, end elevation view of a bogey with the cab of FIG. 1 disposed thereon.

The wheels 16, 17 are shown being supported by a rail 26 disposed on a platform 27 of a bogey 28 which in turn can move along a track 29 on wheels 30, 31 which are disposed to the platform 27 by journals 32, 33. The reverse side of the bogey 28 has additional wheels, only wheel 34 is shown in FIGS. 3 and 6, which ride on a track 35 (shown in FIG. 3) similar to the track 29. The tracks 29, 35 are disposed to the building structure 36.

The wheels 18, 19 are shown being supported by a rail 40 supported on a platform 42 of an elevator car frame 43, which includes stiles 44 and braces 45 of a conventional sort. The car frame 43 is disposed in a hoistway 45 for vertical motion, such as by means of a typical elevator traction machine connected to the car frame and a counterweight by roping, or in any other suitable manner. The nature of the elevator with which the invention is used is irrelevant to the invention. Another bogey 46 is similarly moveable on tracks supported in the building, and is not described further.

Figure 2:
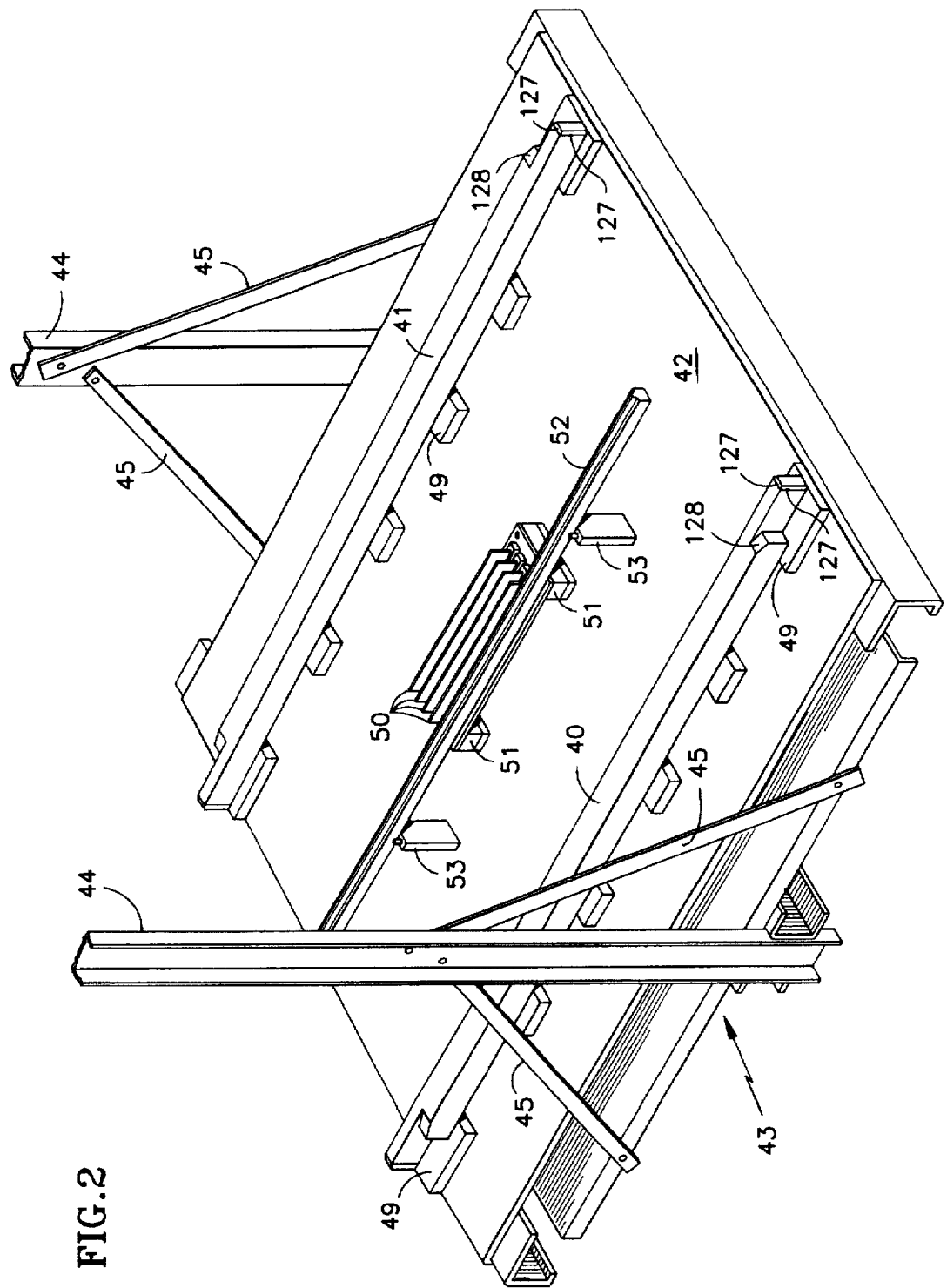
FIG. 2 is a partial perspective view of the elevator car frame of FIG. 1.

Referring now to FIG. 2, the rail 40 and a similar rail 41 may be supported above the platform 42 in any suitable way, such as by blocks 49. Four linear motor primaries 50 are supported above the platform 42 by blocks 51. A wave guide portion 52 of a magnetostrictive linear displacement transducer (MLDT) is supported above the platform 42 by blocks 53.

Referring to FIG. 3, two sets of four linear motor primaries 59, 60 are each disposed to the platform 27 by related blocks 61, 62. A wave guide 63 of the magnetostrictive linear displacement transducer, similar to wave guide 52, is disposed to the platform 22 by blocks 64.

The linear motor primaries 50, 59, 60 work in conjunction with four corresponding secondaries 68 (FIG. 5) which are disposed to the platform 22 of the cab carriage 15 (FIG. 4) such as by mounting blocks 69. Each of the secondaries 68 has a pair of permanent magnets 70 (FIG. 5) disposed within a framework 71. The secondaries 68 extend along the full length of the cab carriage 15. The elevator carriage 15 also has a plurality of permanent magnet marker blocks 77–80 (FIGS. 7–10) disposed to the platform 22 by suitable brackets 81. Only the marker block 77, which is aligned with the waveguide 52 (FIG. 2) is shown in FIG. 4. The marker blocks induce a magnetostrictive strain wave in the waveguide portions 52, 63 to provide an indication of the position of the marker block with respect to the waveguide. The position transducers herein may preferably comprise Balluff DTL-2 magnetostrictive linear displacement transducer.

Referring to FIGS. 4 and 6, as described hereinbefore, each side of the cab carriage 15 has four support wheels 16–19, 23, which support the cab on rails 26, 28 of the bogey, as well as on the rails 40, 41 of the elevator car frame platform (FIG. 2). In order to guide the cab carriage 15 along the rails, each side of the carriage 15 has four guide rollers 86–89 (FIG. 4) and 90 (FIG. 6), secured to the platform 22 by brackets 91. In a preferred embodiment, the rollers 86–91 have eccentric axis adjustment so as to allow accurate positioning of the rollers with respect to the rails 26, 28 (as well as rails 40, 41, FIG. 2). In a preferred embodiment, all of the wheels 16–19, 23 and rollers 86–90 are steel, coated with urethane to reduce noise. In the preferred embodiment, the linear motor may comprise adequate segments of Anorad LEB-8 linear motors.

Referring now to FIGS. 7–10, an illustration of the operation of the linear motors in conjunction with the positional information provided by the magnetostrictive linear displacement transducers shows only three primaries and secondaries 60, 68 (instead of the four illustrated hereinbefore), and illustrates the waveguides 63 and 52 as being on the opposite side of the primaries 60 from that shown hereinbefore, as if the bogey, carriage and car frame were turned around. However, the principle of operation is the same. In FIG. 7, the carriage 15 is centered on the bogey 28. A marker block 80 is at the left end of the waveguide 63 indicating the position of the carriage 15 to be central to the bogey 28. In FIG. 8, the carriage 15 has begun to move off of the bogey 28 and onto the car frame 43. The marker block 80 has advanced about a quarter of the way from the end of the waveguide 63, thereby causing the reflections to indicate the position shown. In FIGS. 7 and 8, the motion of the carriage 15 is caused by interaction of the primary 59 with the secondaries 68 under a motion control responsive to the position indicated by the waveguide 63 as a function of the position of the marker block 80.

In FIG. 9, the carriage 15 has moved to about one-third of the way onto the car frame 43. At this point, the secondaries 68 are also engaging the primaries 50, as well the as the primaries 59. Similarly, the marker block 77 is causing reflections within the waveguide 52 that is disposed on the car frame 43 providing its motor control system with positional information. At this point in time, both or either of the systems (80, 63, 59 or 52, 77, 50) may control the motion of the carriage 15, depending on how the invention is implemented. In FIG. 10, the carriage 15 is moved fully onto the car frame 43 with the primaries 50 disposed centrally of the secondaries 68, and the reflections in the waveguide 52 indicating that the marker block 77 is disposed midway therein. Similar operation can occur when transferring from the car frame 43 to the bogey 28, or in the opposite direction to the bogey 46. A feature of the invention is that positional sensing occurs on each platform (either a bogey or a car frame 43) as a function of the magnetic blocks disposed on the carriage 15, to control the related linear motor through the primaries disposed on the corresponding platform (a bogey or the car frame).

Referring to FIG. 11, a simplified exemplary block diagram illustrates a known type of motor control which may be utilized, if desired. Suitable drive signals are provided to the motor, which in the example given comprises the primary 60 disposed on the bogey 28. The forces in the primary 60 act, as indicated by a dashed line 101, in concert with the secondary 68 disposed on the carriage 15 so as to cause the carriage to move. The position of the carriage is continuously sensed by the magnetostrictive linear displacement transducer, which in this case comprises the waveguide 63, as its magnetostrictive strain waves are induced by the marker block 80 disposed on the carriage 15. This provides a position signal on a line 102 which is provided to a velocity profile generator 103 which provides a velocity command on a line 104 as a function of the current position of the carriage 15. The positional information on the line 102 is converted to a velocity signal on a line 105 by a differentiator 106, which is subtracted in a summing circuit 107 from the velocity command on the line 104. A velocity error signal on a line 108 is provided to a current control 109, the output of which is provided on a line 110 to a suitable drive such as a variable voltage, variable frequency (VVVF) drive control 111. The profile generator 103 also provides an input to the VVVF drive 111, over a line 112. An amplifier 113 provides drive signals to the motor primaries 60 over lines 114, in response to signals on lines 115. A current loop is formed by feedback from the amplifier 113 to the current control 109 over a line 116.

Referring to FIG. 2, the rails 40, 41, are scarfed on the outside, so as to provide a half-lap temporary joint as illustrated with the rails 26, 35 which are similarly scarfed on the inside (FIG. 3). In FIG. 12, a minimal overlap of the rails 26, 40 is illustrated, which may be on the order of one inch (two and one-half centimeters), which is adequate; but a two or three inch (five-seven centimeter) overlap may be used. The bogey may have a buffer to absolutely arrest its motion without any interference between the rails 26, 35 and the rails 40, 41.

The spacing of the wheels 16 and 17 as well as 18 and 19, and the spacing of other pairs of wheels on the reverse side of the carriage 15, is sufficiently great so that either one wheel 16, 18 or the other 17, 19 is supported by a full section of rail 121, 122 (FIG. 12) at all times. Similarly, the rollers 86 and 87 as well as the rollers 88 and 89 are sufficiently spaced so that one roller or the other of each pair is on the flat inside edge 123, 124 of the rails 26, 40 (FIG. 12) at all times. Therefore, the combination of scarfing of the rails and spacing of the wheels and rollers provides a smooth ride in accordance with the invention.

Smoothness and quietness are also enhanced by various tapers provided at the ends of the rails. For instance, referring to the left-hand ends of the rails 40, 41 in FIG. 2, each of the tips has tapers 127 on the sides and on the top. In addition, each has a longer taper 128 on the top surface leading to the scarf. Referring to the right end of the rails 26, 35 in FIG. 3, each of these has a long taper 131 on the outside edge and a short taper 132 on the inside edge and on the top. Each of these may also have a medium length compound taper 133 leading into the scarf. All of these tapers may be of various sizes, but typically may be on the order of between five and seven degrees. The purpose of these tapers is simply to avoid abrupt contact between the rails and the wheels or rollers as the case may be, as a result of minor misalignment, whereby to provide a smooth transition from rail to rail so passengers do not feel any bump. On the other hand, if desired, the invention may be practiced without some or any of the tapers, with tapers of different extents and with tapers of different angles. All of this is irrelevant to the present invention.

The invention has been shown with solid platforms 22, 27, 42 for simplicity. In the best mode of practicing the invention, the bogeys, the carriage and the car frame would be built up of framing, rather than having solid platforms. Although not shown herein for simplicity, the car frame 43 may be locked to a suitable structure affixed to the building structure 36 prior to movement of the carriage between a bogey and the car frame. Such car/floor locks may take the form illustrated in commonly owned copending U.S. patent application Ser. No. 08/565,648, filed on Nov. 29, 1995, or some other form. For clarity of the invention herein, other apparatus has been omitted from the drawing. For instance, the carriage may be locked to either a bogey or to the car frame by means of suitable cab/car locks, which may take the form of those described in a commonly owned U.S. patent application Ser. No. 08/565,658, filed on Nov. 29, 1995, or any other suitable form. Additionally, in its best mode, both the bogeys and the car frame may be provided with some form of carriage brake, in addition to the dynamic braking provided by the linear motors, so as to be able to slow and arrest the motion of the carriage thereon.

From the foregoing it is obvious that the bogey has to be moved on its wheels close to the elevator car frame for the rails to overlap as described. The bogey may be moved by a rope drive of the type commonly used for horizontal transport systems, or by linear or rotary motors of any suitable sort. This is irrelevant to the present invention. The position transducers shown herein comprise similar but separate parts, one being formed by the waveguide 63 and the marker plate 80 for the bogey, the other being formed by the waveguide 52 and the marker plate 77 for the car frame. Other forms of position transducers may be utilized, if desired, even to the extent of position transducers disposed at or near the hoistway, rather than on the elements themselves. This could provide a single set of position signals indicative of where the carriage is on either the bogey or the car frame. Similarly, other types of linear motors may be utilized. In fact, if desired, the invention may be practiced with the active portion disposed on the carriage; however, this makes activation extremely difficult in view of the fact that the cab may travel significantly on the bogey.

The invention is shown with two sets of primaries 59, 60 on the bogey 28 in order to allow the bogey 28 to work in either direction. However, if desired, only one set of primaries 59, 60 need be disposed thereon, so long as the bogey is headed in the right direction when transferring a cab. The invention is shown utilizing four motor segments (sets of primaries and secondaries) in each case, although it may be utilized in systems which require fewer motor segments (primaries and secondaries) or more motor segments. The bogey 28 is shown traveling on tracks 29, 35 with a square cross section; of course, the tracks could have a tee-shaped cross section, or any other desired cross section, having nothing to do with the present invention. The rails 26, 28, 40 are depicted herein as being rectangular, with a horizontal width greater than the vertical height. However, other shapes may be chosen for the rails.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An elevator system, comprising:

a vertically moveable elevator car frame disposed in a hoistway, said elevator car frame having a pair of parallel, spaced apart rails thereon, and an active primary of a linear motor disposed thereon;

a bogey having wheels disposed to roll horizontally on tracks, said bogey having a pair of parallel spaced apart rails disposed thereon so as to be mutually aligned with said rails of said car frame when said bogey is adjacent to said car frame, said bogey having an active primary of a linear motor disposed thereon in coalignment with the active primary disposed on said elevator car frame;

a cab disposed on a wheeled carriage, the wheels of said carriage being spaced to ride on the rails of said car frame and the rails of said bogey and therebetween when said bogey is positioned with its rails adjacent to the rails of said car frame;

a passive linear motor secondary disposed on said carriage in coalignment with said primary on said car frame when said carriage is disposed on said car frame so as to form a linear motor therewith and in coalignment with said primary on said bogey when said carriage is on said bogey so as to form a linear motor therewith;

position transducer means for providing position signals indicative of the relative position of said carriage on said car frame when said carriage is on said car frame and for providing position signals indicative of the position of said carriage on said bogey when said carriage is on said bogey; and motor control means responsive to said position signals to cause at least one of said linear motors to move said carriage.

2. A system according to claim 1 wherein said position sensing means comprises:

a plurality of position transducers, a first part of one transducer being disposed on said car frame, a first part of another transducer being disposed on said bogey, a second part of one transducer being disposed on said carriage for cooperation with said first part of said one transducer so as to provide a position signal indicative of the position of said carriage on said car frame when said carriage is on said car frame, and a second part of said second transducer disposed on said carriage to cooperate with said first part of said second transducer to provide a position signal indicative of the position of said carriage on said bogey when said carriage is on said bogey.

3. A system according to claim 2 wherein said transducers each comprise a magnetostrictive linear displacement transducer.

4. A system according to claim 3 wherein said first parts comprise waveguide portions and said second parts comprise magnetic marker blocks.

* * * * *